(12) United States Patent
Murdoch

(10) Patent No.: US 9,262,425 B2
(45) Date of Patent: *Feb. 16, 2016

(54) PROVIDING ACCESS TO A COLLECTION VIA A PLURALITY OF DISCRETE MACHINE-RECOGNIZABLE CODES

(71) Applicant: Juan Murdoch, Idaho Falls, ID (US)

(72) Inventor: Juan Murdoch, Idaho Falls, ID (US)

(73) Assignee: Smart PJ's LLP, Idaho Falls, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/334,405

(22) Filed: Jul. 17, 2014

(65) Prior Publication Data

US 2014/0326785 A1    Nov. 6, 2014

Related U.S. Application Data

(63) Continuation of application No. 13/208,231, filed on Aug. 11, 2011, now Pat. No. 8,864,018.

(51) Int. Cl.
*G06F 17/00*   (2006.01)
*G06F 17/30*   (2006.01)
*G06K 19/00*   (2006.01)

(52) U.S. Cl.
CPC .... *G06F 17/30091* (2013.01); *G06F 17/30879* (2013.01); *G06K 19/00* (2013.01)

(58) Field of Classification Search
USPC .............. 235/375, 462.01, 462.09, 494
See application file for complete search history.

(56) References Cited

U.S. PATENT DOCUMENTS

| 5,945,656 A | 8/1999 | Lemelson et al. |
| 6,661,433 B1 | 12/2003 | Lee |
| 6,732,915 B1 | 5/2004 | Nelson et al. |
| 7,076,441 B2 | 7/2006 | Hind et al. |
| 7,784,702 B2 | 8/2010 | Michels |
| 8,864,018 B2 | 10/2014 | Murdoch |
| 2006/0180647 A1 | 8/2006 | Hansen |
| 2010/0076766 A1 | 3/2010 | Tsai |
| 2013/0332319 A1 | 12/2013 | Zuber |

*Primary Examiner* — Ahshik Kim
(74) *Attorney, Agent, or Firm* — David R. Conklin; Kirton McConkie

(57) ABSTRACT

Systems and methods for providing access to a collection of related binary files via a collection of machine-recognizable codes provided on a device or consumer item.

19 Claims, 11 Drawing Sheets ously exist for disseminating information via MRC technologies, challenges still exist. Accordingly, it would be an improvement in the art to augment or even replace current techniques with other techniques.

PROVIDING ACCESS TO A COLLECTION VIA A PLURALITY OF DISCRETE MACHINE-RECOGNIZABLE CODES

RELATED APPLICATIONS

This application is a continuation of U.S. patent application Ser. No. 13/208,231, filed Aug. 11, 2011 and titled PROVIDING ACCESS TO A COLLECTION VIA A PLURALITY OF DISCRETE MACHINE-RECOGNIZABLE CODES, which is incorporated herein by reference, in its entirety.

FIELD OF THE INVENTION

The present invention relates generally to systems and methods for providing a user with access to a collection of binary files via a collection of machine-recognizable codes. In particular, the present invention relates to systems and methods for modifying a consumer good to include a plurality of machine-recognizable codes, wherein each discrete machine-recognizable code is linked to a discrete binary file. In turn, each binary file comprises a member of a related collection of binary files, herein referred to as a "collection." Using a smart device, a user accesses a discrete binary file by scanning a discrete machine-recognizable code linked to the discrete binary file.

BACKGROUND OF THE INVENTION

Traditionally, machine-recognizable codes (MRCs) are used for inventory control purposes or point of sale automation. The utilization usually requires scanners manufactured for certain code types to perform the scanning mechanism to decode and match with connected database servers for pricing or other pre-determined tasks like warehouse stocking and inventory.

However, with advent and broad expanse of smart devices, such as smartphones, multimedia players and handheld computers, MRC are now being used to disseminate all types of information, to all types of users. MRCs now commonly appear in magazines, on signs, buses, business cards, television screens, or almost any object about which users might need information. Smart devices equipped with a camera and the correct reader application can scan the image of the MRC to display text, contact information, connect to a wireless network, or open a webpage in the smart device's browser. Generally, the MRC either provides the user with a narrow piece or information, or provides the user with access to a website or software program whereby the user may obtain additional information by performing additional directed searches, or by browsing. Thus, the users must rely on their own skills and aptitude to collect desired information beyond that provided by the MRC.

Thus, while system and methods currently exist for disseminating information via MRC technologies, challenges still exist. Accordingly, it would be an improvement in the art to augment or even replace current techniques with other techniques.

BRIEF SUMMARY OF THE INVENTION

The present invention relates generally to systems and methods for providing a user with access to a collection of binary files via a collection of machine-recognizable codes. In particular, the present invention relates to systems and methods for modifying a consumer good to include a plurality of machine-recognizable codes, wherein each discrete machine-recognizable code is linked to a discrete binary file. In turn, each binary file comprises a member of a related collection of binary files, herein referred to as a "collection." Using a smart device, a user accesses a discrete binary file by scanning a discrete machine-recognizable code linked to the discrete binary file.

Some aspects of the present invention provide an system whereby a collection of related binary files are individually linked to a collection MRCs, wherein the collection of MRCs are provided or otherwise made accessible on a device or consumer item. Thus, a user accesses binary file members of the collection of related binary files by scanning or detecting discrete MRCs of the collection of MRCs. The user is therefore provided with access to an entire collection of related binary files by purchasing or otherwise having access to the consumer item.

The present invention further includes methods for camouflaging the collection of MRCs within a pattern or functional aspect of the consumer item. In some implementations, a device or consumer item includes a first discrete MRC linked to a first discrete binary file of a collection of related binary files, and further includes a second discrete MRC linked to a second discrete binary file of the collection of related binary files.

Some aspects of the present invention further provide a system for enabling a user to access a collection of related binary files, the system including a device or consumer item having a plurality of MRC individually linked to a plurality of discrete binary files of a collection of binary files, the system further including a computer device having a computer-readable medium for storing a computer executable software program for providing access to a discrete binary file of a collection of related binary files, the program including instructions for recognizing a discrete MRC, locating a database comprising a collection of related binary files, retrieving the discrete binary file linked to the recognized discrete MRC, and displaying the retrieved discrete binary file on the computer device.

Further, some aspects of the invention provide software, recorded on a computer-readable medium, for enabling a user to access a collection of related binary files, the software performing the steps of 1) recognizing a first discrete MRC, 2) establishing communication with a database comprising a collection of related binary files, 3) locating within the collection of related binary files a discrete binary file linked to the first discrete MRC, 4) retrieving the discrete binary file linked to the first MRC, 5) displaying the retrieved discrete binary filed linked to the first MRC on a smart device, 6) recognizing a second discrete MRC, 7) establishing communication with the database containing the collection of related binary files, 8) locating within the collection of related binary files the discrete binary file linked to the second MRC, 9) retrieving the discrete binary file linked to the second discrete MRC, and 10) displaying the retrieved discrete binary file lined to the second discrete MRC on the smart device.

In some implementations of the present invention, a collection of related binary files is provided which may include a collection of stories, a collection of articles, a collection of photos, a collection of images, a collection of paintings, a collection of drawings, a collection of reports, a collection of songs, a collection of texts, a collection of multimedia files, a collection of videos, and/or a collection of executable programs. Further, in some embodiments the collection of related binary files are related based upon at least one of a common author, a common theme, a common character, a common subject matter, a common owner, and a common brand.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. These drawings depict only typical embodiments of the invention and are not therefore to be considered to limit the scope of the invention.

DETAILED DESCRIPTION OF THE INVENTION

Embodiments of the present invention will be best understood by reference to the drawings, wherein like reference numbers indicate identical or functionally similar elements. It will be readily understood that the components of the present invention, as generally described and illustrated in the figures herein, could be arranged and designed in a wide variety of different configurations. Thus, the following more detailed description, as represented in the figures, is not intended to limit the scope of the invention as claimed, but is merely representative of presently preferred embodiments of the invention.

As used herein, the term "binary file" is understood to include a computer file which may include any type of data, encoded in a binary form for computer storage and processing purposes.

As used herein, the term "container format" is understood to include a meta-file format whose specification describes how different data elements and metadata coexist in a computer or binary file.

As used herein, the term "collection" is understood to include a group of related binary files and corresponding machine-recognizable codes, wherein the collection is defined by a relationship which exists between the various discrete binary files.

As used herein, the term "discrete" is understood to include a single binary file of a collection of related binary files. The term is further understood to include a single machine-recognizable code which corresponds or is linked to a discrete binary file of a collection.

As used herein, the term "device" or "consumer item" is understood to include any item on which a machine-recognizable code may be displayed, printed, reproduced, imaged, provided, scanned, viewed and/or captured, such that the machine-recognizable code is detectable by a computer device.

As used herein, the term "computer device" or "smart device" is understood to include a personal computer, a notebook computer, a personal digital assistant ("PDA") or other hand-held device, a workstation, a minicomputer, a mainframe, a supercomputer, a multi-processor system, a computer-based device, a network computer, a processor-based consumer electronic device, a smartphone, and the like.

As used herein, the term "machine-recognizable code" or "MRC" is understood to include any technology which comprises a machine-readable representation of data which includes instructions or information that is deciphered by a dedicated MRC reader, a smartphone, or any processor-based device having optics or other hardware/software configurations to detect or "read" the MRC, such as a webcam. Non-limiting examples of MRCs include QR codes, barcodes, matrix barcodes, high capacity color barcodes, stacked barcodes, EZcode, MaxiCode, Aztec Code, and radio frequency identification (RFID) technologies.

Figure 1:
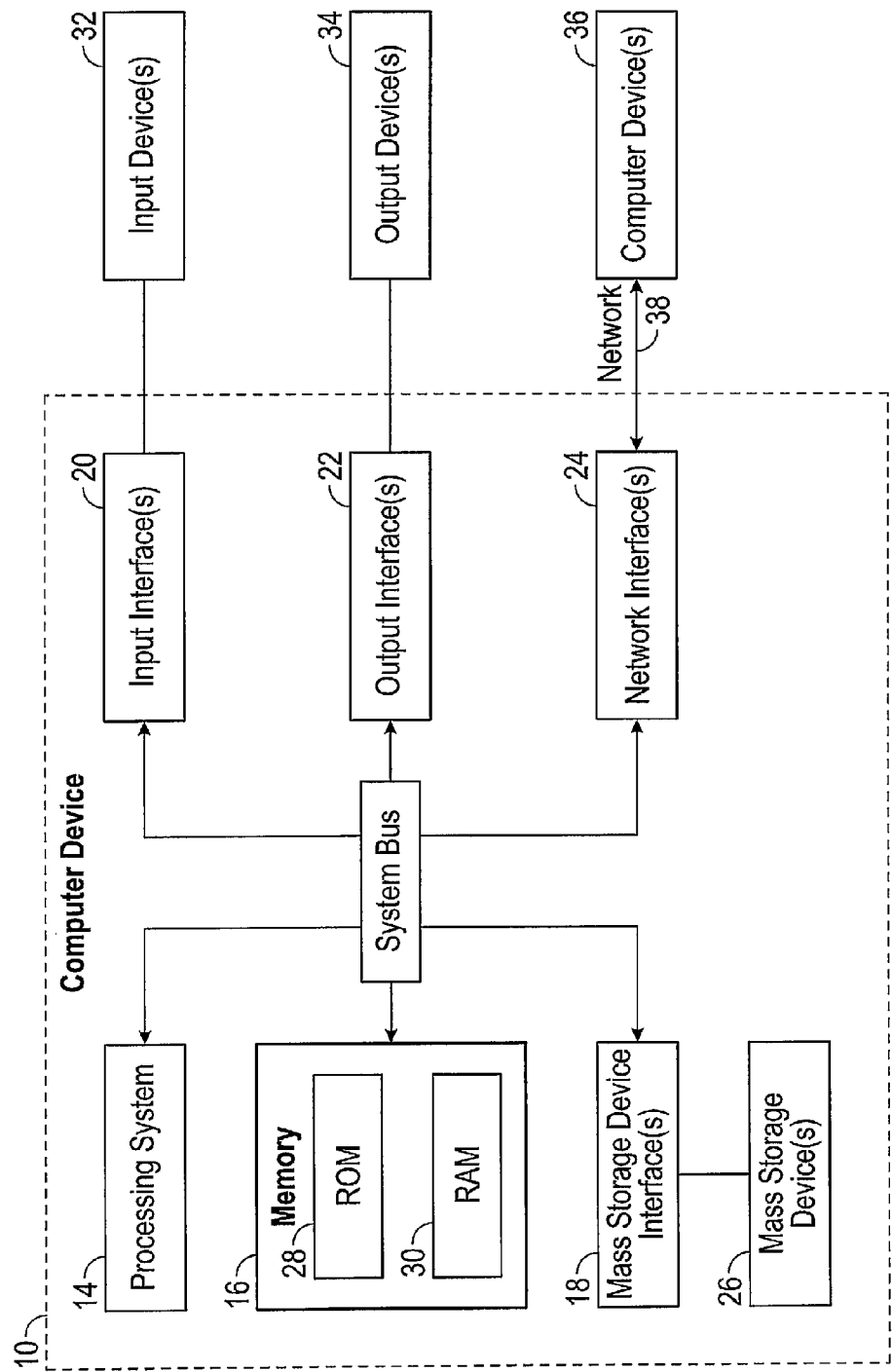
FIG. 1 illustrates a representative system that provides a suitable operating environment for use of the present invention.
Figure 2:
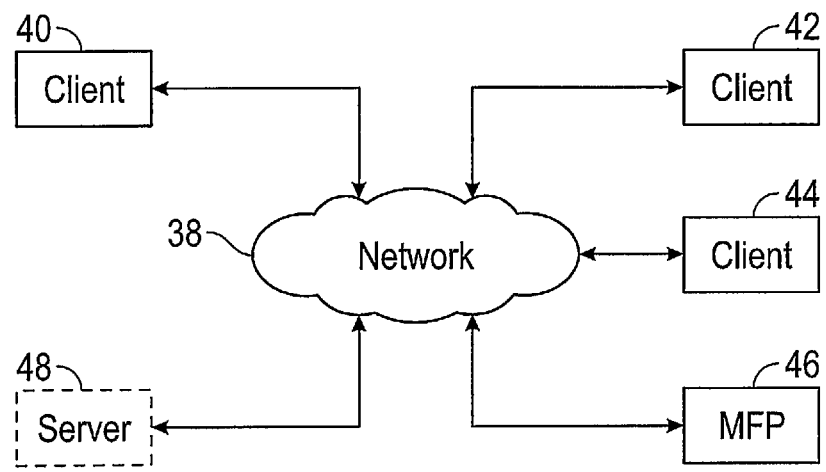
FIG. 2 illustrates a representative networked system for use in association with various embodiments of the present invention.

Referring now to FIG. 1 and FIG. 2 and the corresponding discussion, a general description of a suitable operating environment is provided in which embodiments of the present invention may be implemented. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), stand alone electronic devices, and other such electronic environments.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing embodiments of the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, a smart phone, a position identifier, a ball collector, or the like.

Computer device 10 may include a system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, thumb drives, solid state memory, a universal serial bus or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, thumb drive tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), an integrated circuit, a firewire (IEEE 1394), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen, a speaker, a printer, a multi-functional peripheral, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Thus, while those skilled in the art will appreciate that embodiments of the present invention may be practiced in a variety of different environments with many types of system configurations, FIG. 2 provides a representative networked system configuration that may be used in association with embodiments of the present invention. The representative system of FIG. 2 includes a computer device, illustrated as client 40, which is connected to one or more other computer devices (illustrated as client 42 and client 44) and one or more peripheral devices (illustrated as multifunctional peripheral (MFP) MFP 46) across network 38. While FIG. 2 illustrates an embodiment that includes a client 40, two additional clients, client 42 and client 44, one peripheral device, MFP 46, and optionally a server 48, connected to network 38, alternative embodiments include more or fewer clients, more than one peripheral device, no peripheral devices, no server 48, and/or more than one server 48 connected to network 38. Other embodiments of the present invention include local, networked, or peer-to-peer environments where one or more computer devices may be connected to one or more local or remote peripheral devices. Moreover, embodiments in accordance with the present invention also embrace a single electronic consumer device, wireless networked environments, and/or wide area networked environments, such as the Internet.

Various embodiments of the present invention may be utilized to provide a user with access to a desired, discrete binary file from a collection of related discrete binary files stored within a database on a server. In some embodiments the discrete binary file comprises formatted or plain text. In other embodiments, the discrete binary file is an audio file, such as a music or audio recording. In other embodiments the discrete binary file comprises a video file. Further, in some embodiments the discrete binary file comprises an audio/video or multimedia file.

In some embodiments, the discrete binary file is a container format used to identify and interleave different data types. For example, in some embodiments the discrete binary file comprises a container format that is exclusive to audio data, such as AIFF, WAV and XMF formats. In other embodiments, the discrete binary file comprises a container format that is exclusive to still image data, such as FITS and TIFF formats. Further still, in other embodiments the discrete binary file comprises a flexible or multi-media container which is capable of holding many types of audio, video and other media data, such as 3GP, ASF, AVI, DVR-MS, FLV, F4V, IFF, JPEG 2000, MPEG, MPEG-2, MP4, Ogg, RM, NUT, MXF, GXF, ratDVD, SVI, VOB and DivX media formats.

In general, a database is provided within which is stored a collection of related binary files. In some embodiments, the database is located locally within a computer device which is used to detect a discrete machine recognizable code (MRC). In other embodiments, the database is located remotely on a server that is accessible via a network connection.

Some embodiments of the present invention relate to methods and systems whereby a plurality of MRCs are individually linked to a plurality of discrete binary files, wherein each of the discrete binary files comprise a member of a collection of related binary files. A desired, discrete binary file of the collection of related binary files is then accessed by scanning or otherwise detecting the MRC that is individually or specifically linked to desire binary file of the collection. In some embodiments, the MRC is detected using a smart device, such as a handheld device or other computer processor-based device. Once the MRC is detected, the smart device is used to access the desired binary file.

Figure 3:
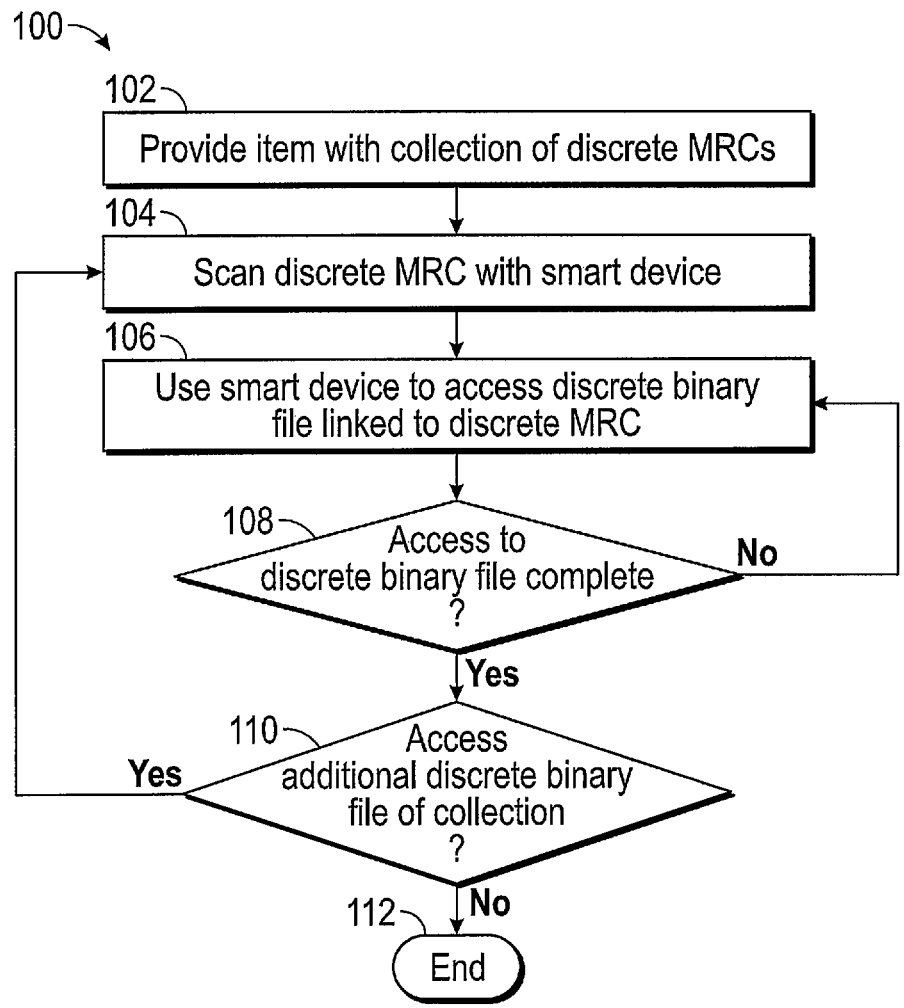
FIG. 3 illustrates a method for retrieving a discrete binary file of a collection of related binary files is shown in accordance with a representative embodiment of the present invention.

Referring now to FIG. 3, a method 100 for retrieving a discrete binary file of a collection is show. In some embodiments a plurality of MRCs is presented to a user by printing or otherwise providing the collection of MRCs on a consumer item or other device 102. A consumer item or other device may include an item on which a MRC may be displayed, printed, reproduces, imaged, provided, scanned, viewed and/or captured, such that the MRC is detectable by a computer device. Non-limiting examples of consumer products or other devices may include an article of clothing, packaging materials, a book, a toy, memorabilia, bedding, school or office supplies, a container, wall paper, a computer screen, and a publication. For example, in some embodiments an item of clothing is modified to include the collection of MRCs, wherein each discrete MRC of the collection is linked to a discrete binary file of a collection of related binary files. In other embodiments, a book is modified to include the collection MRCs. Further, in some embodiments an insert of a compact disc or digital video disc is modified to include the collection of MRCs. The user thereby gains access to a discrete binary file of the collection of related binary files by scanning or otherwise detecting a discrete MRC which is accessible via the consumer item or other device 104.

In some embodiments, the collection of MRCs are printed or otherwise presented openly on the consumer item, whereby the MRCs are easily detected and scanned by a compatible smart device. In other embodiments, the collection of MRCs are camouflaged within a pattern or design of the consumer item, such that the presence of MRCs on the consumer device is not apparent. For example, in some embodiments the collection of MRCs is integrated into a pattern or design of the consumer item. In other embodiments, the design or pattern of the consumer item is comprised entirely or partially of the collection of MRCs. Thus, in some embodiments the presence of the collection of MRCs does not detract from a desired appearance of the consumer item.

In some embodiments, a discrete MRC is detected or scanned with a smart device 104 in order to gain access to a discrete binary file of a collection of related binary files 106. In some embodiments, the MRC contains instructions or information encoded within the MRC. For example, in some embodiments the MRC comprises text that is reproduced by the smart device and made available to a user. In other embodiments, the MRC comprises a web address that directs the smart device to access a website which presents the binary file to the user. In some embodiments, the MRC comprises a remote address that directs the smart device to access a binary file stored in a remote database. Further, in some embodiments the MRC comprises a local address that directs the smart device to access a binary file that is stored in a database or file located on the smart device.

Once the binary file has been accessed by the smart device, the contents of the binary file are extracted, processed and presented to the user on the smart device until access is completed 108. Following completion of the binary file, additional discrete binary files of the collection of related binary files may be accessed 110 by detecting or scanning additional discrete MRCs from the collection of discrete MRCs 104. In some embodiments, the smart device accesses the discrete binary file 108 until a second or additional discrete MRC is detected by the smart device 110, 104. Where no additional discrete MRC is detected, the method for retrieving members of the collection of binary files is terminated 112.

In some embodiments, the member binary files of the collection of related binary files are changed or cycled, such that collection of binary files is dynamic in nature. For example, in some embodiments a collection of discrete MRCs is linked to a first collection of related binary files during a first period of time, and linked to a second collection of related binary files during a second period of time. Thus, the collection of binary files may be changed to suit the needs or wants of a user. For example, in some embodiments a collection of binary files is changed or altered to reflect a holiday, a season or a special event, such as a birthday. Additionally, the collection of binary files may be changed based upon the age of the owner of the consumer item. For example, where the consumer item is a backpack, and the collection of binary files comprises educational material, such as study aids, the collection of binary files may be changed as the student moves to a different grade. Thus, the student may access a new or augmented collection of information (i.e.: binary files) using an existing consumer item and existing MRCs.

Figure 4:
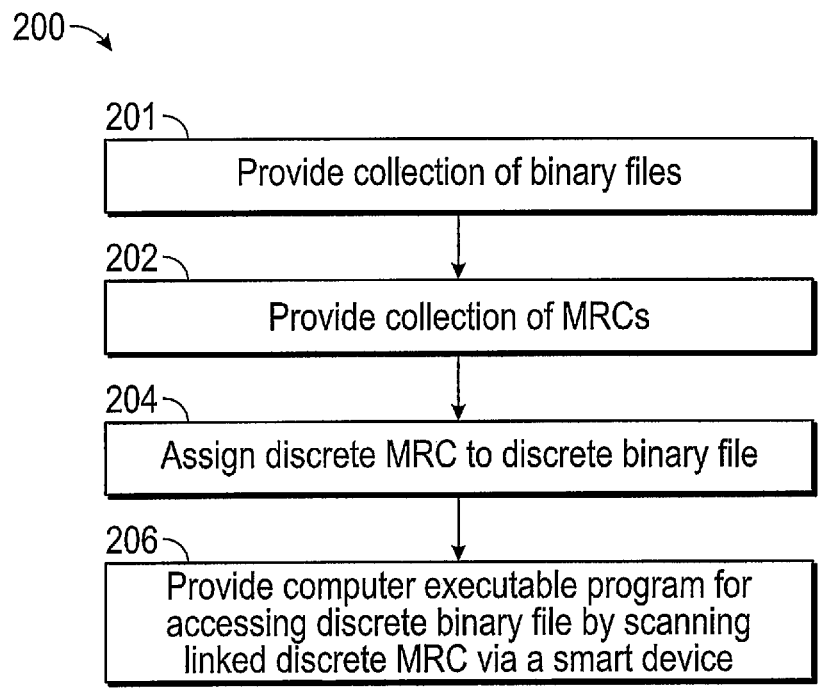
FIG. 4 illustrates a method for linking a collection of related binary files to a collection of machine-recognizable codes in accordance with a representative embodiment of the present invention.

Referring now to FIG. 4, a method 200 for linking a collection of related binary files to a collection of MRCs is shown. In some embodiments, a group of related binary files is identified as a collection 201. Non-limiting examples of related binary files which comprise a collection include a group of related music files (such as a music album), a group of related picture files, a group of related video files, a group of related executable programs, a group of related text files (such as a collection of short stories, or bedtime stories), a group of related webpages, a group of related recipes, a group of related multimedia files, a group of educational content, and a group of files having a common author, subject, theme, character or owner.

One having skill in the art will appreciate that the method by which a group of discrete binary files is determined to comprise a collection is not limited to the above examples. Rather, the collection is determined by grouping the discrete binary files based upon some understanding of a relationship or commonality which exists between the subject matter of the discrete binary files when viewed as a collection. In some embodiments, a collection of related binary files comprises two binary files. In other embodiments, a collection of related binary files comprises more than two binary files. Each individual or discrete binary file of the collection of related binary files comprises a member of the collection. Thus, the collection of related binary files is defined by the interrelatedness of the individual binary files which make up the collection, and not the number of related binary files in the collection.

Once the collection of binary files has been provided 202, a collection of discrete MRCs is provided 204, wherein the number of discrete MRCs is equal to the number of discrete binary files which comprise the collection. A process of assignment is then performed wherein each discrete binary file is assigned and linked to a discrete MRC 204. As such, when a discrete MRC is detected by a smart device, the instructions contained within the discrete MRC provide the smart device with access to the linked binary file.

In some embodiments, a computer executable program is provided for accessing the collection of discrete binary files by scanning the linked discrete MRCs with a smart device 206. For example, in some embodiments this step 206 comprises providing a software application that is loaded on the smart device, whereby the smart device is enabled to recognize and execute instructions contained within the MRC to locate and gain access to the linked binary file. An application may be downloaded and installed on the smart device by a consumer. Alternatively, the smart device may comprise a dedicated MRC reader and output device, wherein the software application comprises a firmware of the smart device.

In some embodiments a smart device is provided having software and hardware capabilities for detecting a MRC and following instructions contained therein. In some embodiments, a smart device comprises a software application, recorded on a computer-readable medium, for enabling a user to access a collection of related binary files, the software performing the steps of 1) recognizing a discrete MRC, 2) establishing communication with a database comprising a collection of related binary files, 3) locating within the collection of related binary files a discrete binary file lined to the discrete MRC, and 4) retrieving the discrete binary file linked to the discrete MRC, 5) displaying the retrieved binary file on a smart device. In some embodiments, the software further performs steps for scanning additional MRCs and locating, retrieving and displaying the contents of the binary files on the smart device, wherein the binary file comprise a collection of related binary files.

Figure 5:
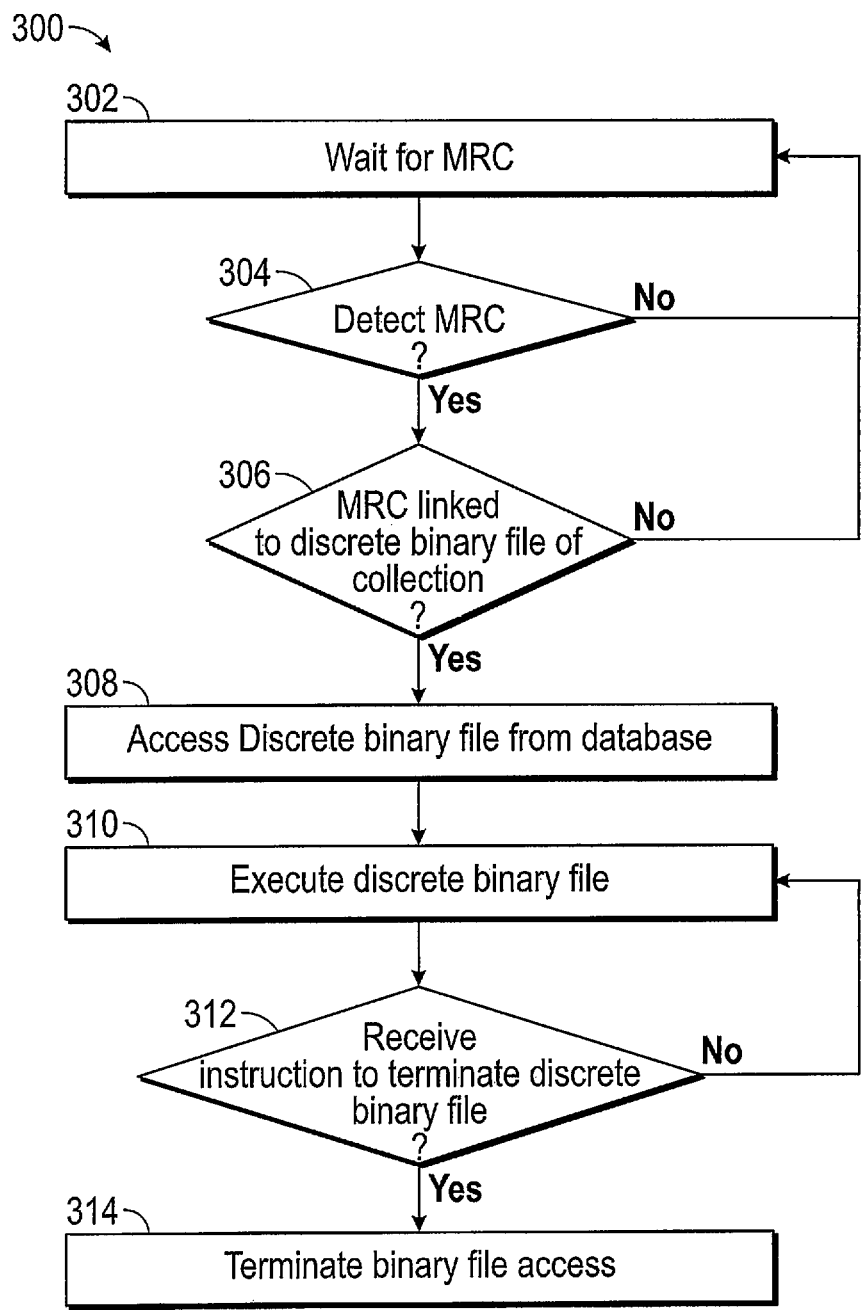
FIG. 5 illustrates a method by which a smart device detects a machine-recognizable code and retrieves a discrete binary file from collection of related binary files in accordance with a representative embodiment of the present invention.

Referring now to FIG. 5, a method 300 by which a smart device detects a MRC and retrieves a discrete binary file from a collection of related binary files, is shown. In some embodiments, a smart device waits to detect a MRC, such as in a standby mode 302. In some embodiments, the standby mode is initiated by opening a software application on the smart device. In other embodiments, the firmware of the smart device readies the device to wait for an MRC when the smart device is powered on.

Once a MRC has been detected 304, the smart device determines whether the MRC is linked to a discrete binary file of a collection 306. In some embodiments, step 306 is accomplished by comparing the information contained within the detected MRC with a database log stored on the smart device. Alternatively, step 306 is accomplished by comparing the information contained within the detected MRC with a database log stored at a remote location, such as a remote server that is accessible via a network connection. If the detected MRC is determined not to be linked to a discrete binary file of a collection of binary files, the device ignores the MRC and resumes a standby mode. If the detected MRC is determined to be linked to a discrete binary file of a collection of binary files, the device accesses the discrete binary file from the database or other storage location 308. The smart device then executes or otherwise displays the information or content of the discrete binary file, such that a user may access the information or content 310.

In some embodiments, the smart device receives instructions to terminate execution of the binary file 312. For example, in some embodiments a user will exit the software application which is being utilized by the smart device to display the binary file. In other embodiments, the binary file contains instruction for terminating playback or execution of the binary file upon completion of the binary file's intended use. Further, in some embodiments execution of the binary file is automatically terminated following a download or installation of the binary file on the smart device. In response to the instructions to terminate the discrete binary file 312, the smart device terminates access to the binary file 314.

Figure 6:
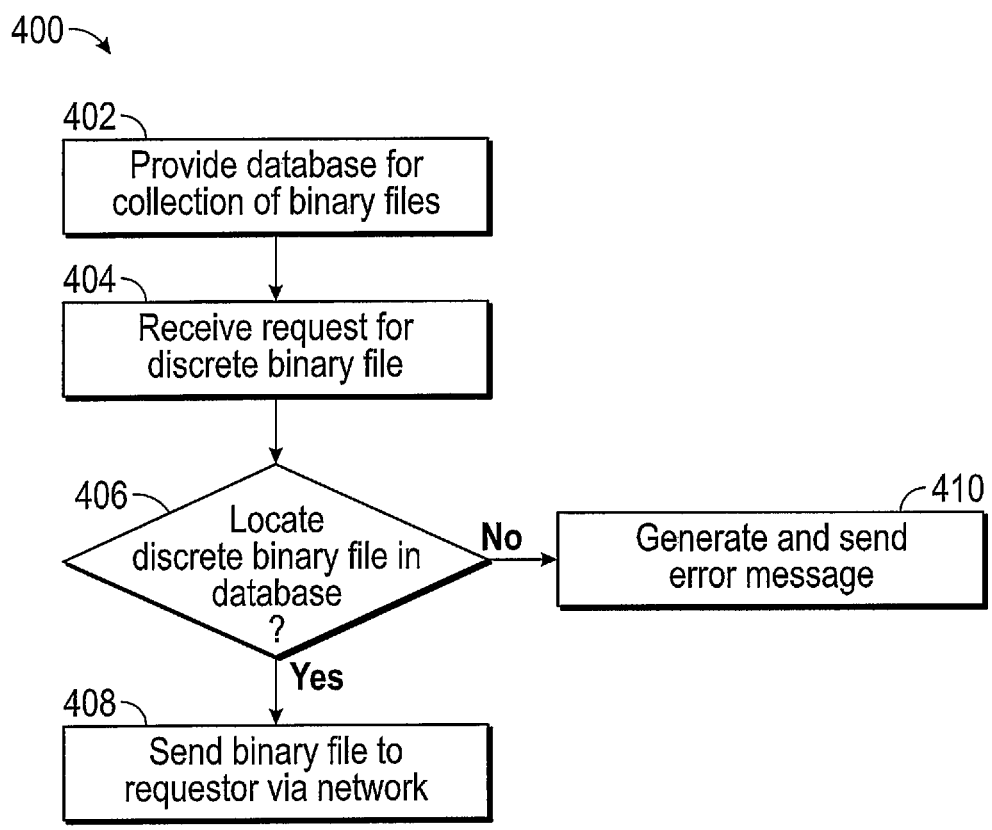
FIG. 6 illustrates a method for storing, maintaining and providing access to a collection of related binary files in accordance with a representative embodiment of the present invention.

Referring now to FIG. 6, a method 400 for storing and providing access to a collection of related binary files is shown. In some embodiments, a remote database of related binary files is stored and maintained as a collection 402. In some embodiments, database storage of a collection of related binary files is offered as a service to an owner of a collection of related binary files. In other embodiments, database storage of a collection of related binary files is provided as a resource whereby a manufacturer of items comprising a collection of discrete MRCs is able to provide access to the collection of discrete, yet related binary files which are linked to the collection of discrete MRCs coupled to or otherwise associated with the manufacturer's items.

In some embodiments, a business method is provided whereby electronic storage is made available for storage of binary files which have been determined to be part of a defined collection of related binary files. The business method includes a step whereby a plurality of related binary files are uploaded and cataloged within the electronic storage, thereby providing an accessible database for the related binary files. The database further comprises a database log, whereby the contents of the database are able to be searched by reference to the database log. In some embodiments, an owner or lessee of the collection of related binary files rents or leases the electronic storage space. In other embodiments, a plurality of collections are amassed and stored within the accessible database, thereby providing access to more than one collection of related binary files.

In some embodiments, the database receives a request for a discrete binary file in response to a discrete MRC being scanned or otherwise detected by a smart device 404. In some embodiments, the database compares the request to the contents of the database to locate the discrete binary file within the database 406. If the requested binary file is located within the database, the discrete binary file is sent to the requestor via a networked connection 408. If the requested binary file is not located within the database, an error message is generated and sent to the requestor via a networked connection 410.

In some embodiments, the database further comprises password and username protection, wherein the database requires the requestor to submit identifying information prior to sending the requested binary file. In other embodiments, the database further performs a systems compatibility analysis to ensure that the requested binary file is compatible with the system of the requestor.

Figure 7:
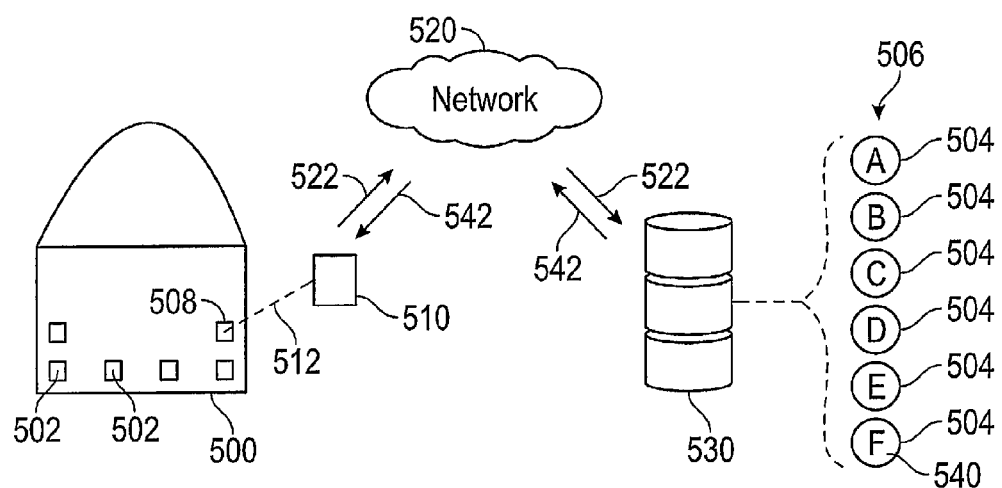
FIG. 7 illustrates a system in which a binary file is retrieved from a collection of related binary files stored on a database server via a networked connection in accordance with a representative embodiment of the present invention.

To further illustrate the various teachings and embodiments described above, a schematic view of a consumer item 500, a smart device 510, a network connection 520 and a remote database 530 is shown in FIG. 7. In some embodiments, a consumer item 500, such as a handbag, is provided having a plurality of MRCs 502. Each of the MRCs is distinctly linked to a discrete binary file 504 of a collection 506 of related binary files, which are stored on a database server 530. The smart device 510 is used to scan or otherwise detect 512 one of the discrete MRCs 504. The smart device 510 then generates and sends a request 522 for the linked discrete binary file 540 via network connection 520. Database server 530 then locates the requested discrete binary file 540 and sends 542 the binary file, or other information whereby to enable smart device 510 to access the requested binary file 540. Upon scanning additional members of the collection of MRCs on consumer item 500, additional requests are sent to database server 530 thereby resulting in additional members 504 of the collection 506 being send to or otherwise made available to smart device 510.

Figure 8A:
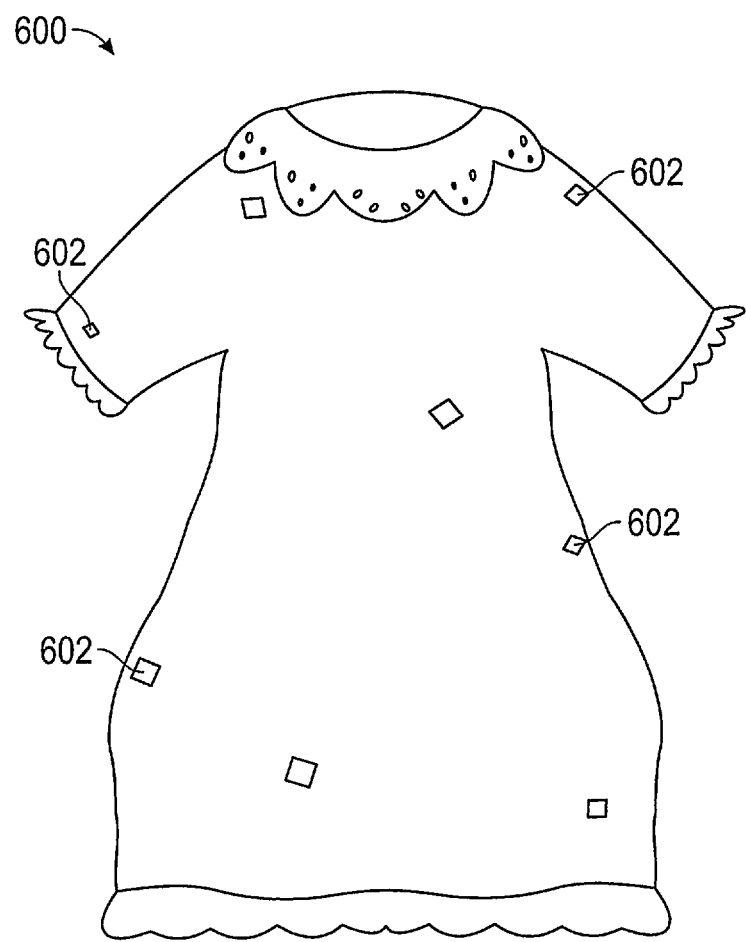
FIG. 8, shown in parts A-C, illustrates a consumer item having a collection of machine-recognizable codes provided thereon in accordance with various representative embodiments of the present invention.

The method by which the collection of MRCs 502 is placed or presented on the consumer item 500 may vary depending upon the type of consumer item and an intended function of the MRCs. For example, in some embodiments the collection of MRCs 502 provide a decorative pattern on the consumer item 500, such as a border. In other embodiments, the collection of MRCs 602 are randomly presented on the consumer item 600, as shown in FIG. 8A. Here, a nightgown or other piece of clothing comprises a plurality of MRCs 602 which comprise a collection of MRCs. The method by which the MRCs have been arranged on the item 600 is random and serves no other purpose than to provide user access to the MRCs 602.

Figure 8B:
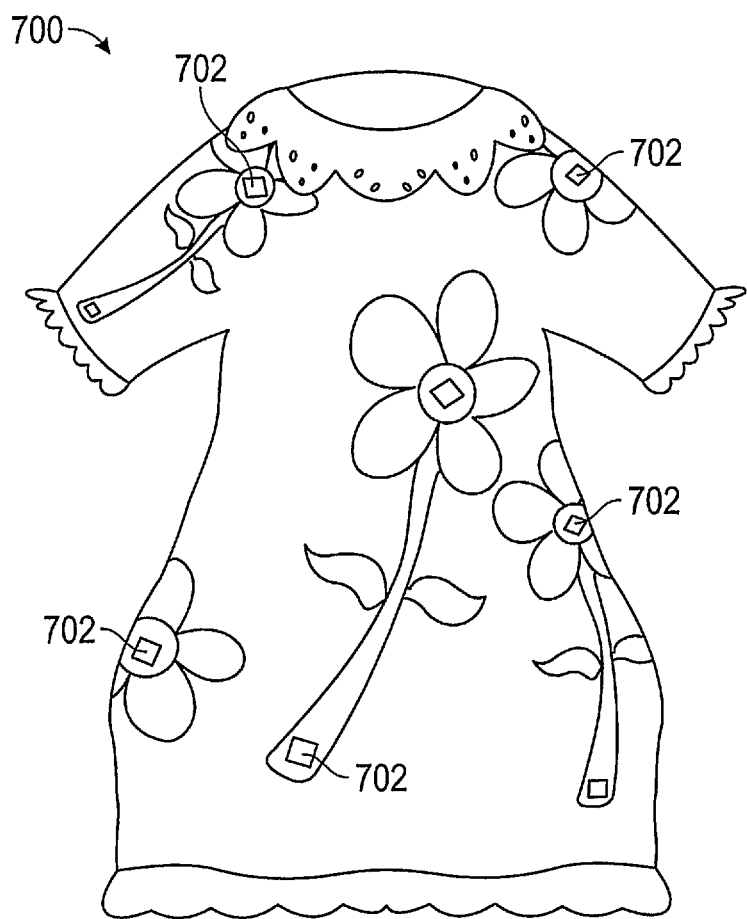
Figure 8C:
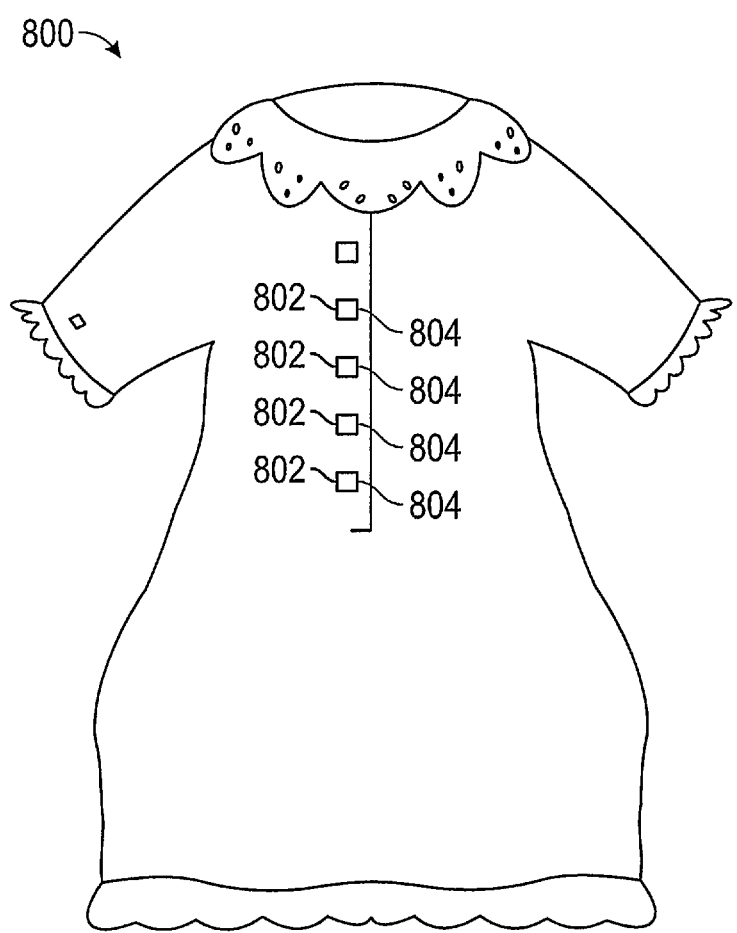

Referring now to FIG. 8B, a consumer item 700 is shown, wherein the collection of MRCs 702 have been incorporated or camouflaged within a pattern of the consumer item 700. As such, the presence of MRCs 702 is not readily detectable. Further still, in some embodiments a collection of MRCs 802 have been incorporated into a function feature of the consumer item 800, as shown in FIG. 8C. In particular, in some embodiments the collection of MRCs 802 is incorporated into buttons 804 of the consumer item 800. Thus, the MRCs 802 serve a dual function for the consumer item 800.

Figure 9:
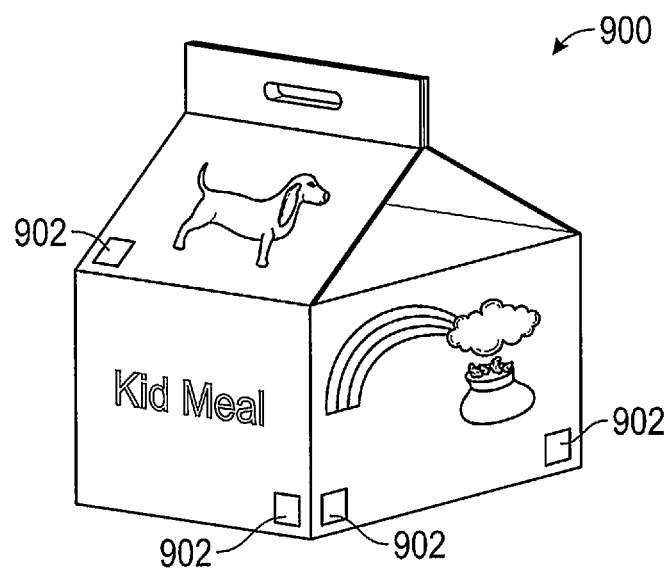
FIG. 9 illustrates a food packaging item having a collection of machine-recognizable codes provided thereon in accordance with a representative embodiment of the present invention.

Referring now to FIG. 9, a food packaging item 900 is shown which includes a collection of MRCs 902. In some embodiments, food packaging item 900 comprises a theme or subject matter which targets a specific consumer or group of consumers. Accordingly, in some embodiments the collection of MRCs 902 is individually linked to a collection of binary files (not shown) that are related to the subject matter of the food packaging item 900. For example, in some aspects of the present invention a MRC is linked to a binary file which contains a multimedia file related to the subject matter of the food packaging item 900. Further, additional MRCs of the food packaging item are linked to various binary files which contain additional information related to the subject matter of the item 900.

EXAMPLES

From the foregoing, it will be seen that a smart device can gain access to a collection of related binary files by provided a collection of MRCs on a consumer item or other device, wherein the collection of MRCs are individually linked to member binary files of the collection. Accordingly, one benefit of the present invention is to provide a consumer with access to a collection of related binary files by selling a consumer item which includes a collection of MRCs which are linked to the binary files of the collection. The elements of the present invention achieve this benefit, as demonstrated in the examples below.

Example 1

In some embodiments an article of clothing, such as a pajama or a nightgown is provided having a plurality of MRCs printed or otherwise displayed thereon. Each MRC is individually linked to binary file of a collection of bedtime stories. Upon scanning or detecting a discrete MRC on the article of clothing with a smart device, the smart devices gains access to the linked binary file and presents a bedtime story to the user. In some embodiments, the binary file comprises the text of the bedtime story, thereby requiring the user to read the story. In other embodiments, the binary file comprises at least one of audio or video, thereby enabling the user to listen to, and/or watch the bedtime story. Further, in some embodiments the binary files enable the user to listen to the story while following or reading-along with text provided on the smart device.

Example 2

In some embodiments a book is provided having a discrete MRC printed on each page of the book. Each MRC is individually linked to a binary of a collection of binary files, wherein each binary file is an audio file which contains the text of the page on which the discrete MRC is provided. Thus, a reader is able to scan the MRC with a smart device and listen to the audio file while reading or looking at the page.

Example 3

In some embodiments a book bag, backpack, folder or other school item comprises a collection of MRCs, wherein each MRC is distinctly linked to a discrete binary file containing information related to the owner of the book bag, backpack, folder or other school item. For example, in some embodiments a student's backpack comprises a first MRC which is linked to a binary file comprising report card information for the student, a second MRC which is linked to a binary file comprising homework information for the student, and a third MRC which is linked to a binary file comprising progress report information for the student. A fourth MRC may be further provided which is linked to a binary file comprising a communication from the student's school or school teacher. In some embodiments, the MRCs are registered by the student's school or teacher and linked to the respective binary files in a database maintained by the school or teacher.

Example 4

In some embodiments a toy is provided which comprises a collection of MRCs, wherein each MRC is linked to a discrete binary file of a collection of binary files which are related to the toy. For example, where the toy is an action figure, the collection of binary files may include various website links, audio files, video files, text files, game files, etc. which are related to the action figure.

Example 5

In some embodiments a music CD is provided which comprises a collection of MRCs, wherein each MRC is a music video file of the music provided on the music CD. In some embodiments, the collection of MRCs is provided on the music CD. In other embodiments the collection of MRCs is provided on the packaging or cover of the music CD. In other embodiments the collection of MRCs is provided on an insert within the packaging of the music CD.

Example 6

In some embodiments a DVD is provided which comprises a collection MRCs, wherein each MRC is linked to a discrete binary file of a collection of binary files which are related to the DVD. For example, the collection of binary files may include various website links, audio files, video files, text files, game files, and a digital download of the movie on the DVD.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A device comprising a consumer item and having a first discrete machine-recognizable code comprising a surface of the consumer item and forming a perceptible design or pattern on the consumer item, the first machine-recognizable code being linked to a first discrete binary file of a collection of related binary files, the consumer item further comprising a second discrete machine-recognizable code comprising a surface of the consumer item and further forming a perceptible design or pattern on the consumer item, the second machine-recognizable code being linked to a second discrete binary file of the collection of related binary files.

2. The device of claim 1, wherein the first and second discrete machine-recognizable codes are readable by a hand-held portable computer device.

3. The device of claim 1, wherein the collection of related binary files are stored in a database.

4. The device of claim 3, wherein the database is located on the hand-held portable computer device.

5. The device of claim 3, wherein the database is accessible via a network connection.

6. The device of claim 1, wherein the first and second machine-recognizable codes are printed on the consumer item.

7. The device of claim 1, wherein the perceptible design or pattern of the consumer item consists essentially of the first and second machine-recognizable codes.

8. A system for enabling a user to access a collection of related binary files, the system comprising:

a device comprising a consumer item having a first discrete machine-recognizable code comprising a surface of the consumer item and providing a pattern or design on the surface of the consumer item, the first discrete machine-recognizable code being linked to a first discrete binary file of a collection of related binary files, the consumer item further comprising a second discrete machine-recognizable code comprising the surface of the consumer item and providing a pattern or design on the surface of the consumer item, the second machine-recognizable code being linked to a second discrete binary file of the collection of related binary files; and a hand-held computer device having a computer-readable medium for storing a computer executable software program for providing access to a discrete binary file of the collection of related binary files, the program including instructions for:

recognizing a discrete machine-recognizable code;
locating a database comprising the collection of related binary files;
retrieving the discrete binary file linked to the recognized discrete machine-recognizable code; and
displaying the retrieved discrete binary file on the computer device.

9. The system of claim 8, wherein the hand-held computer device is a smart device.

10. The system of claim 8, wherein the hand-held computer device is at least one of a personal digital assistant, a notebook computer, a processor-based consumer device, and a smartphone.

11. The system of claim 8, wherein the consumer item is selected from a group consisting of an article of clothing, packaging material, a book, a toy, memorabilia, bedding, a school supply, a container, a computer screen, and a publication.

12. The system of claim 8, wherein the collection of related binary files are related based upon at least one of a common author, a common theme, a common character, a common subject matter, a common owner, and a common brand.

13. Software, recorded on a computer-readable medium, for enabling a user to access a collection of related binary files, the software performing the steps of:

recognizing a first discrete machine-recognizable code comprising a surface of a consumer item and further comprising a design or pattern of the consumer item;
establishing communication with a database stored on computer-readable medium of a hand-held computer device, the database comprising a collection of related binary files;
locating within the collection of related binary files a discrete binary file linked to the first discrete machine-recognizable code;
retrieving the discrete binary file linked to the first machine-recognizable code;
displaying the retrieved discrete binary file linked to the first discrete machine-recognizable code on a display of the hand-held computer device;
recognizing a second discrete machine-recognizable code on the surface of the consumer item and further comprising a design or pattern of the consumer item;
establishing communication with the database;
locating within the collection of related binary files a discrete binary file linked to the second machine-recognizable code;
retrieving the discrete binary file linked to the second machine-recognizable code; and
displaying the retrieved discrete binary file linked to the second discrete machine-recognizable code on the display of the hand-held computer device.

14. The software of claim 13, further including:
recognizing a plurality of discrete machine-recognizable codes further comprising the surface of the consumer item;
establishing communication with the database comprising the collection of related binary files;
locating within the collection of related binary files a plurality of discrete binary files linked to the plurality of discrete machine-recognizable codes;
retrieving the plurality of discrete binary files linked to the plurality of machine-recognizable codes; and
displaying the retrieved plurality of discrete binary files linked to the plurality of machine-recognizable codes on the display of the hand-held computer device.

15. The software of claim 13, wherein establishing communication with the database comprising the collection of related binary files is accomplished via a wireless network connection.

16. The software of claim 13, wherein the collection of related binary files comprises at least one of a collection of stories, a collection of articles, a collection of photos, a collection of images, a collection of paintings, a collection of drawings, a collection of reports, a collection of songs, a collections of videos, and a collection of executable programs.

17. The software of claim 16, wherein the collection of related binary files is a collection of bedtime stories.

18. The software of claim 13, wherein the retrieved discrete binary file is a single story from a collection of related stories.

19. The software of claim 13, wherein the collection of related binary files are related based upon at least one of a common author, a common theme, a common character, a common subject matter, a common owner, and a common brand.

* * * * *